(12) United States Patent
Han et al.

(10) Patent No.: US 10,113,488 B2
(45) Date of Patent: Oct. 30, 2018

(54) APPARATUS AND METHOD FOR CONTROLLING FUEL INJECTION

(71) Applicants: HYUNDAI MOTOR COMPANY, Seoul (KR); KIA MOTORS CORPORATION, Seoul (KR)

(72) Inventors: Dong Hee Han, Seoul (KR); Seungwoo Hong, Seoul (KR); Yeongseop Park, Seoul (KR); Jong Il Park, Seoul (KR); Hyungbok Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/710,430

(22) Filed: Sep. 20, 2017

(65) Prior Publication Data

US 2018/0163641 A1  Jun. 14, 2018

(30) Foreign Application Priority Data

Dec. 14, 2016 (KR) .......................... 10-2016-0170808

(51) Int. Cl.
*F02D 35/02* (2006.01)
*F02D 1/06* (2006.01)
(Continued)

(52) U.S. Cl.
CPC ............. *F02D 1/065* (2013.01); *F02D 35/02* (2013.01); *F02D 35/023* (2013.01); *F02D 41/00* (2013.01); *F02D 41/0042* (2013.01); *F02D 41/14* (2013.01); *F02D 41/18* (2013.01); *F02D 41/182* (2013.01); *F02D 41/30* (2013.01); *F02D 2200/0406* (2013.01); *F02D 2200/0408* (2013.01)

(58) Field of Classification Search
CPC ........ F02D 35/02; F02D 35/023; F02D 1/065; F02D 41/00; F02D 41/0042; F02D 41/14; F02D 41/18; F02D 41/182; F02D 41/30; F02D 2200/0406; F02D 2200/0408
See application file for complete search history.

(56) References Cited

U.S. PATENT DOCUMENTS 5,675,080 A * 10/1997 Wada ........................ F01P 11/14
                                                                      123/568.16
9,624,854 B2 *  4/2017 Lee ........................ F02D 41/006
9,689,336 B2 *  6/2017 Hardy .................. F02D 41/2477

* cited by examiner

*Primary Examiner* — Hieu T Vo
(74) *Attorney, Agent, or Firm* — McDermott Will & Emery LLP (57) ABSTRACT

An apparatus for controlling fuel injection according to an exemplary embodiment of the present disclosure may include a driving information detector for detecting driving information including a fresh air amount flowing into an intake manifold through a throttle valve, a recirculation gas amount supplied to the intake manifold through an exhaust gas recirculation apparatus, a fuel vapor amount supplied to the intake manifold through a canister purge system, a gas amount supplied to a cylinder from the intake manifold, an internal pressure of the intake manifold, an internal temperature of the intake manifold, a pressure of a recirculation gas and a temperature of the recirculation gas; an injector for injecting fuel into the cylinder; and a controller for calculating gas amount supplied to the cylinder at a next intake stroke from the driving information and controlling fuel amount injected by the injector at the next intake stroke to be a target air-fuel ratio.

15 Claims, 5 Drawing Sheets

(51) Int. Cl.
  *F02D 41/18*   (2006.01)
  *F02D 41/00*   (2006.01)
  *F02D 41/14*   (2006.01)
  *F02D 41/30*   (2006.01)

APPARATUS AND METHOD FOR CONTROLLING FUEL INJECTION

CROSS-REFERENCE TO RELATED APPLICATION

This application is based on and claims the benefit of priority to Korean Patent Application No. 10-2016-0170808 filed on Dec. 12, 2016 with the Korean Intellectual Property Office, the entire contents of which are incorporated herein by reference.

TECHNICAL FIELD

The present disclosure relates to an apparatus and a method for controlling fuel injection. More particularly, the present disclosure relates to an apparatus and a method for controlling fuel injection that controls fuel amount by predicting gas amount supplied to a cylinder.

BACKGROUND

Generally, fuel amount of a gasoline engine is determined based on a theoretical air-fuel ratio. As fuel amount approaches to the theoretical air-fuel ratio, fuel can be completely combusted in a cylinder and purifying efficiency of a catalyst for purifying exhaust gas is improved.

In order to control the fuel amount to be the theoretical air-fuel ratio, it is important to predict an exact air amount supplied to the cylinder.

Further, recently, a LIVC (late intake valve closing) control is used in order to reduce pumping loss of an engine. The LIVC control means that a closing timing of an intake valve is retarded after BDC (bottom dead center).

However, according to the conventional art, since it does not consider that air flowing into the cylinder at an intake stroke flows backward into an intake manifold at a compression stroke, the exact air amount supplied to the cylinder cannot be calculated and thus an exact fuel amount based on the theoretical air-fuel ratio cannot be calculated.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an apparatus and a method for controlling fuel injection that can exactly calculate gas amount supplied to a cylinder in order to exactly calculate fuel amount injected to the cylinder.

An apparatus for controlling fuel injection according to an exemplary embodiment of the present disclosure may include a driving information detector for detecting driving information including a fresh air amount flowing into an intake manifold through a throttle valve, a recirculation gas amount supplied to the intake manifold through an exhaust gas recirculation apparatus, a fuel vapor amount supplied to the intake manifold through a canister purge system, a gas amount supplied to a cylinder from the intake manifold, an internal pressure of the intake manifold, an internal temperature of the intake manifold, a pressure of a recirculation gas and a temperature of the recirculation gas; an injector for injecting fuel into the cylinder; and a controller for calculating a gas amount supplied to the cylinder at a next intake stroke from the driving information and controlling a fuel amount injected by the injector at the next intake stroke to be a target air-fuel ratio.

The controller may calculate the fuel amount injected to the cylinder at the next intake stroke based on a gas amount flowing backward into the intake manifold at a previous compression stroke, a gas amount flowing backward into the intake manifold at a current compression stroke and a gas amount supplied to the cylinder at a current intake stroke.

The controller may further calculate a pressure in the intake manifold from variation of an air amount passing through the intake manifold and variation of the recirculation gas amount, and calculates the gas amount supplied to the cylinder at the next intake stroke from the pressure in the intake manifold.

The gas amount supplied to the cylinder in accordance with the pressure in the intake manifold may be determined by experiments.

The pressure in the intake manifold and the pressure of the recirculation gas may be calculated from the pressure in the intake manifold at the current intake stroke, the pressure of the recirculation at the current intake stroke, a pressure variation in the intake manifold at the current intake stroke, a pressure variation of the recirculation at the current intake stroke, the pressure variation in the intake manifold at a previous intake stroke, and the pressure variation of the recirculation flowing into the intake manifold at the previous intake stroke.

The pressure in the intake manifold may be calculated from an equation of $$\begin{bmatrix} P_{IM} \\ P_{EGR} \end{bmatrix}^{N+1} = \begin{bmatrix} P_{IM} \\ P_{EGR} \end{bmatrix}^{N} + \frac{\Delta t}{2} \left( \begin{bmatrix} \dot{P}_{IM} \\ \dot{P}_{EGR} \end{bmatrix}^{N-1} + \begin{bmatrix} \dot{P}_{IM} \\ \dot{P}_{EGR} \end{bmatrix}^{N} \right),$$

wherein $P_{IM}$ is the pressure in the intake manifold, $P_{EGR}$ is the pressure of the recirculation gas, $\dot{P}_{IM}$ is a pressure variation in the intake manifold, and $\dot{P}_{EGR}$ is pressure variation of the recirculation gas.

The fuel amount injected to the cylinder at the next intake stroke may be calculated from the gas amount supplied to the cylinder at the current intake stroke, the gas amount flowing backward into the intake manifold at the current compression stroke, the gas amount flowing backward into the intake manifold at the previous compression stroke, and the target air-fuel ratio.

The fuel amount injected to the cylinder at the next intake stroke may be calculated from an equation of $$m_{FULE} = \frac{m_{CYL,FG,(N)} + m_{R,FG,(N)} - m_{R,FG,(N-1)}}{AFR},$$

wherein $m_{CYL,FG,(N)}$ is the gas amount supplied to the cylinder at the current intake stroke, $m_{R,FG,(N)}$ is the gas amount flowing backward into the intake manifold at the current compression stroke, $\dot{m}_{R,FG,(N-1)}$ is the gas amount flowing backward into the intake manifold at the previous compression stroke, and AFR is the target air-fuel ratio.

A method for controlling fuel injection according to another exemplary embodiment of the present disclosure may include calculating, by a controller, a variation of a gas amount passing through an intake manifold at a previous intake stroke and a current intake stroke; calculating, by the controller, a pressure in the intake manifold based on the variation of the gas amount passing through the intake manifold; calculating, by the controller, a gas amount supplied to the cylinder at a next intake stroke based on the pressure in the intake manifold; calculating, by the controller, a fuel amount which is injected to the cylinder to be a target air-fuel ratio based on the gas amount supplied to the cylinder; and controlling, by the controller, an injection to inject the fuel amount at the next intake stroke.

The gas amount supplied to the cylinder in accordance with the pressure in the intake manifold may be determined by experiments.

The pressure in the intake manifold and a pressure of a recirculation gas may be calculated from the pressure in the intake manifold at a current intake stroke, the pressure of the recirculation at the current intake stroke, a pressure variation in the intake manifold at the current intake stroke, a pressure variation of the recirculation at the current intake stroke, the pressure variation in the intake manifold at a previous intake stroke, and the pressure variation of the recirculation flowing into the intake manifold at the previous intake stroke.

The pressure in the intake manifold may be calculated from an equation of $$\begin{bmatrix} P_{IM} \\ P_{EGR} \end{bmatrix}^{N+1} = \begin{bmatrix} P_{IM} \\ P_{EGR} \end{bmatrix}^{N} + \frac{\Delta t}{2}\left(\begin{bmatrix} \dot{P}_{IM} \\ \dot{P}_{EGR} \end{bmatrix}^{N-1} + \begin{bmatrix} \dot{P}_{IM} \\ \dot{P}_{EGR} \end{bmatrix}^{N}\right),$$

wherein $P_{IM}$ is the pressure in the intake manifold, $P_{EGR}$ is the pressure of the recirculation gas, $\dot{P}_{IM}$ is a pressure variation in the intake manifold, and $\dot{P}_{EGR}$ is a pressure variation of the recirculation gas.

The fuel amount injected to the cylinder at the next intake stroke may be calculated from the gas amount supplied to the cylinder at the current intake stroke, the gas amount flowing backward into the intake manifold at the current compression stroke, the gas amount flowing backward into the intake manifold at the previous compression stroke, and the target air-fuel ratio.

The fuel amount injected to the cylinder at the next intake stroke may be calculated from the gas amount supplied to the cylinder at the current intake stroke, the gas amount flowing backward into the intake manifold at the current compression stroke, the gas amount flowing backward into the intake manifold at the previous compression stroke, and the target air-fuel ratio.

the fuel amount injected to the cylinder at the next intake stroke is calculated from an equation of $$m_{FULE} = \frac{m_{CYL,FG,(N)} + m_{R,FG,(N)} - m_{R,FG,(N-1)}}{AFR},$$

wherein $m_{CYL,FG,(N)}$ is the gas amount supplied to the cylinder at the current intake stroke, $m_{R,FG,(N)}$ is the gas amount flowing backward into the intake manifold at the current compression stroke, •$m_{R,FG,(N-1)}$ is the gas amount flowing backward into the intake manifold at the previous compression stroke, and AFR is the target air-fuel ratio.

According to an exemplary embodiment of the present disclosure, it is possible to exactly calculate fuel amount injected at a next intake stroke corresponding to a theoretical air-fuel ratio (or target air-fuel ratio) from air amount suppled to a cylinder at a previous intake stroke and a current intake stroke, and air amount flowing backward into an intake manifold at a previous compression stroke.

Further, since the fuel amount injected into the cylinder can be controlled corresponding to the theoretical air-fuel ratio (or target air-fuel ratio), purification efficiency by catalyst of an exhaust gas purification apparatus can be improved.

BRIEF DESCRIPTION OF THE DRAWINGS

The drawings are used to be referred to in describing exemplary embodiments of the present disclosure, so a technical concept of the present disclosure should not be meant to restrict the disclosure to the accompanying drawings.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

To clarify the present disclosure, portions irrespective of description are limited and like numbers refer to like elements throughout the specification.

The sizes and thicknesses of the configurations shown in the drawings are provided selectively for the convenience of description, such that the present disclosure is not limited to those shown in the drawings and the thicknesses are exaggerated to make some parts and regions clear.

Hereinafter, an apparatus for controlling fuel injection according to an exemplary embodiment of the present disclosure will be described in detail with reference to accompanying drawings.

Figure 1:
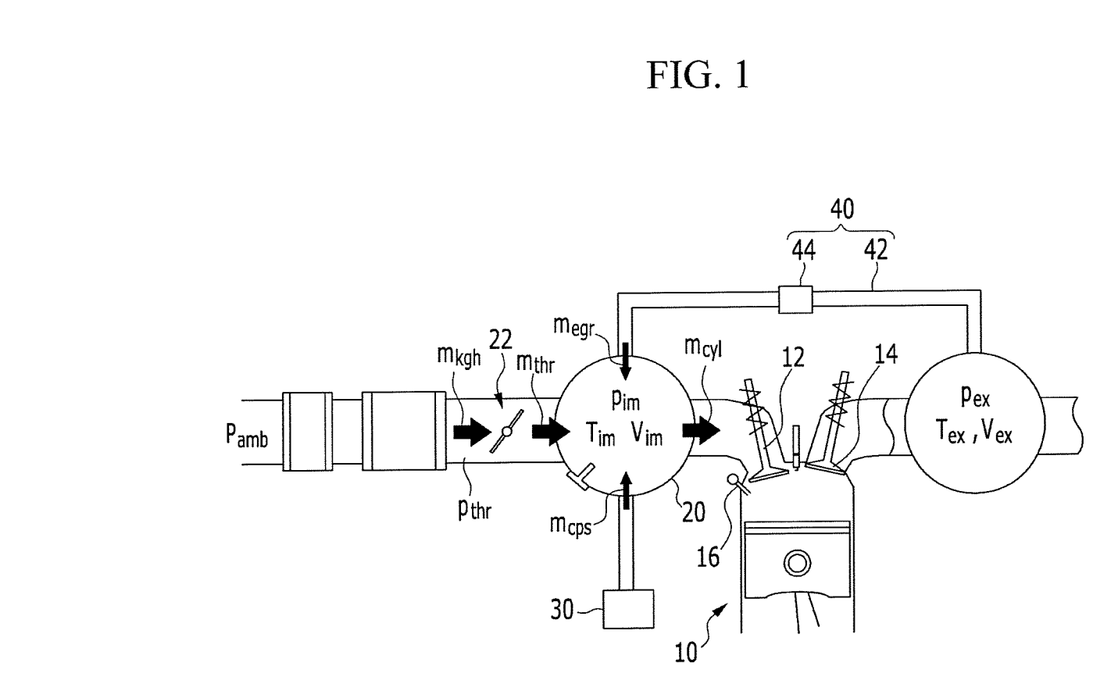
FIG. 1 is a schematic view illustrating an apparatus for controlling fuel injection according to an exemplary embodiment of the present disclosure.
Figure 2:
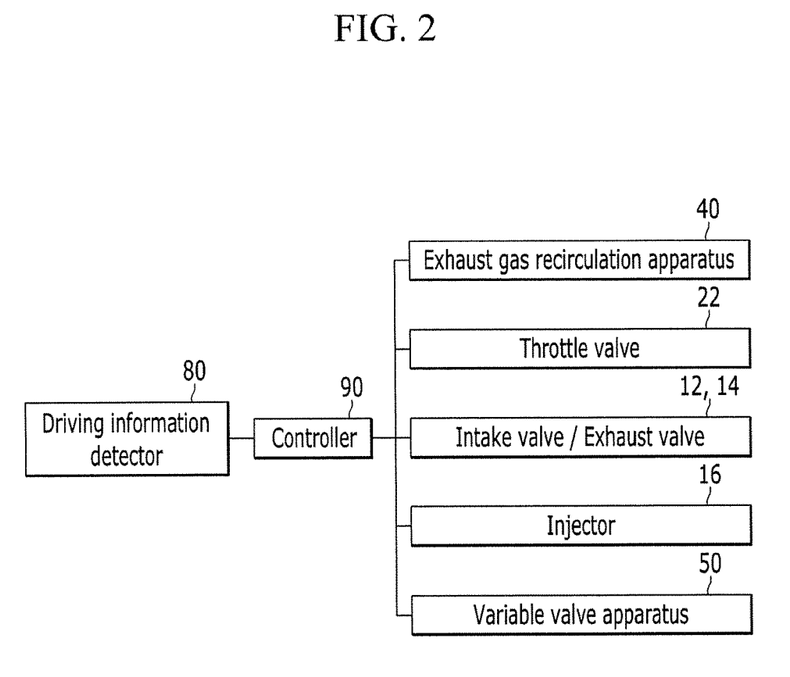
FIG. 2 is a block diagram illustrating an apparatus for controlling fuel injection according to an exemplary embodiment of the present disclosure.

FIG. 1 is a schematic view illustrating an apparatus for controlling fuel injection according to an exemplary embodiment of the present disclosure. FIG. 2 is a block diagram illustrating an apparatus for controlling fuel injection according to an exemplary embodiment of the present disclosure.

As shown in FIG. 1 and FIG. 2, an engine applied to an apparatus for controlling fuel injection according to an exemplary embodiment of the present disclosure may include a plurality of cylinder 10 for generating driving torque by burning fuel, an intake manifold 20 for diving air supplied to the cylinders 10, an exhaust gas recirculation apparatus 40 for resupplying some of exhaust gas discharged from the cylinders 10 to the cylinders 10, an injector 16 for injecting fuel to the cylinders 10, and a throttle valve 22 for adjusting gas amount supplied to the cylinders 10.

The engine may further include a fuel vapor purge system 30 (in other words, a canister purge system). The fuel vapor purge system 30 supplies fuel vapor generated in a fuel tank to the cylinder 10 through a purge line. The fuel vapor purge system is widely known in the art, so a more detailed description thereof will not be presented in the present specification.

The engine may further include a variable valve apparatus (VVA) 50. The variable valve apparatus 50 may include a variable valve timing apparatus for adjusting opening timing of an intake valve 12 or an exhaust valve 14, and/or a variable valve duration apparatus for adjusting opening duration of the intake valve 12 or the exhaust valve 14. The variable valve timing apparatus is widely known in the art, so a more detailed description thereof will not be presented in the present specification.

A LIVC (late intake valve closing) in which retards IVC timing (intake valve closing timing) after BDC (bottom dead center) can be realized through the variable valve apparatus 50 such that pumping loss can be reduced.

The exhaust gas recirculation apparatus 40 includes an EGR line 42 branched from an exhaust line and merged into the intake manifold 20, and a EGR valve 44 disposed in the EGR line 42 and adjusting recirculation gas amount.

Operations of the exhaust gas recirculation apparatus 40, the injector 16, the throttle valve 22 are controlled by control signals of a controller 90. That is, the controller 90 controls the operations of the exhaust gas recirculation apparatus 40, the injector 16 and the throttle valve 22 based on a driving information detected by a driving information detector 80.

For this, the controller 90 may include at least one processor which is operated by a preset program, and the predetermined program performs respective steps of the method for controlling fuel injection according to an exemplary embodiment of the present disclosure.

The driving information may include a fresh air amount flowing into the intake manifold 20 through the throttle valve 22, a recirculation gas amount supplied to the intake manifold 20 through the exhaust gas recirculation apparatus 40, a fuel vapor amount supplied to the intake manifold 20 through the canister purge system 30, a gas amount supplied to the cylinder 10 from the intake manifold 20, an internal pressure of the intake manifold 20, an internal temperature of the intake manifold 20, a pressure of a recirculation gas and a temperature of the recirculation gas.

For this, the driving information detector 80 may include a flow amount detecting sensor (hot film mass air flow sensor: HFM sensor), and a pressure sensor (manifold absolute pressure sensor: MAP sensor).

For example, the gas amount supplied to the cylinders 10 may be detected from the pressure in the intake manifold 20 and an opening degree of the throttle valve 22 and the EGR valve 42.

The gas amount flowing backward into the intake manifold 20 from the cylinders 10 may be detected from the gas amount flowing into the intake manifold 20 at a specific stroke (e.g., a summation of fresh air amount inflowing from outside and recirculation gas amount) and the gas amount flowing into intake manifold 20 at next stroke (e.g., a summation of fresh air amount inflowing from outside and recirculation gas amount).

The driving information detected by the driving information detector 80 is transmitted to the controller 90.

Variation of the gas amount passing through the intake manifold 20 may be calculated by using a law of conservation of mass. That is, the controller 90 may calculate the variation of the gas amount passing through the intake manifold 20 from following equation 1.

$$\frac{\partial M_{IM}}{\partial t} = \dot{m}_{THR} + \dot{m}_{EGR} + \dot{m}_{CPS} - \dot{m}_{CYL} \quad \text{[equation 1]}$$

Herein, $\dot{m}_{THR}$ is a fresh air amount flowing into the intake manifold through the throttle valve, $\dot{m}_{EGR}$ is a recirculation gas amount flowing into the intake manifold through the exhaust gas recirculation apparatus, $\dot{m}_{CPS}$ is an air amount flowing into the intake manifold through the fuel vapor purge system and $\dot{m}_{CYL}$ is a gas amount supplied to the cylinder 10 from the intake manifold.

When the equation 1 is substituted for an ideal gas equation, the equation 1 is expressed as following equation 2.

$$\frac{\partial P_{IM}}{\partial t} = \frac{R_{IM} T_{IM}}{V_{IM}} (\dot{m}_{THR} + \dot{m}_{EGR} + \dot{m}_{CPS} - \dot{m}_{CYL}) \quad \text{[equation 2]}$$

Herein, $R_{IM}$ is a gas constant of the fresh air, $T_{IM}$ is a temperature in the intake manifold, and $V_{IM}$ is an internal volume of the intake manifold.

Variation of the recirculation gas amount passing through the intake manifold 20 may be calculated by using a law of conservation of mass. That is, the controller 90 may calculate the variation of the recirculation gas amount passing through the intake manifold 20 from following equation 3.

$$\frac{\partial M_{EGR}}{\partial t} = \dot{m}_{EGR} - \dot{m}_{CYL,EGR} \quad \text{[equation 3]}$$

Herein, $\dot{m}_{EGR}$ is the recirculation gas amount flowing into the intake manifold through the exhaust gas recirculation apparatus 40, and $\dot{m}_{CYL,EGR}$ is the recirculation gas amount supplied to the cylinder 10 from the intake manifold.

When the equation 3 is substituted for the ideal gas equation, the equation 3 is expressed as following equation 4.

$$\frac{\partial P_{EGR}}{\partial t} = \frac{R_{EGR} T_{IM}}{V_{IM}} (\dot{m}_{EGR} - \dot{m}_{CYL,EGR}) \quad \text{[equation 4]}$$

Herein, $R_{EGR}$ is a gas constant of the of the recirculation gas, $T_{IM}$ is a temperature in the intake manifold and $V_{IM}$ is an internal volume of the intake manifold.

The controller may predict a pressure variation in the intake manifold through the equation 2 and the equation 4. That is, the pressure in the intake manifold and the pressure of the recirculation gas may be calculated from the pressure in the intake manifold at a current intake stroke, the pressure of the recirculation at the current intake stroke, a pressure variation in the intake manifold at the current intake stroke, a pressure variation of the recirculation at the current intake stroke, the pressure variation in the intake manifold at a previous intake stroke, and the pressure variation of the recirculation flowing into the intake manifold at the previous intake stroke.

When the differential equations of the equation 2 and the equation 4 are summarized, following equation 5 can be obtained.

$$\begin{bmatrix} P_{IM} \\ P_{EGR} \end{bmatrix}^{N+1} = \begin{bmatrix} P_{IM} \\ P_{EGR} \end{bmatrix}^{N} + \frac{\Delta t}{2}\left(\begin{bmatrix} \dot{P}_{IM} \\ \dot{P}_{EGR} \end{bmatrix}^{N-1} + \begin{bmatrix} \dot{P}_{IM} \\ \dot{P}_{EGR} \end{bmatrix}^{N}\right) \quad \text{[equation 5]}$$

Herein,
$[P_{IM}]^{N+1}$ is the pressure in the intake manifold 20 at the next intake stroke, $[P_{EGR}]^{N+1}$ is the pressure of the recirculation gas at the next intake stroke, $[P_{IM}]^{N}$ is the pressure in the intake manifold 20 at the current intake stroke, $[P_{EGR}]^{N}$ is the pressure of the recirculation gas at the current intake stroke, $[\dot{P}_{IM}]^{N-1}$ is the pressure variation in the intake manifold 20 at the previous intake stroke, $[\dot{P}_{EGR}]^{N-1}$ pressure variation of the recirculation gas at the previous intake stroke, $[\dot{P}_{IM}]^{N}$ is the pressure variation in the intake manifold 20 at the current intake stroke, and $[\dot{P}_{IM}]^{N}$ is the pressure variation of the recirculation gas at the current intake stroke.

When the simultaneous differential equation of the equation 5 is solved,
it is possible to obtain the pressure in the intake manifold 20 and the pressure of the recirculation gas at next stroke.

The controller 90 can calculate the gas amount supplied to the cylinder 10 at next intake stroke from the pressure in the intake manifold 20. The air amount supplied to the cylinder 10 is not linearly proportional with respect to the pressure in the intake manifold 20. Therefore, the air amount supplied to the cylinder 10 with respect the pressure in the intake manifold 20 can be determined by experiment and stored in the controller 90 as a map data format.

The controller 90 calculates the fuel amount injected into the cylinder 10 at next intake stroke from the gas amount supplied to the cylinder 10 at next intake stroke. At this time, the controller 90 may calculate the fuel amount corresponding to a theoretical air-fuel ratio (or, target air-fuel ratio). The fuel amount injected in to the cylinder 10 at next intake stroke can be calculated from following equation 6.

$$m_{FULE} = \frac{m_{CYL,FG,(N)} + m_{R,FG,(N)} - m_{R,FG,(N-1)}}{AFR} \quad \text{[equaiton 6]}$$

Herein, $m_{CYL,FG,(N)}$ is the gas amount supplied to the cylinder 10 at current intake stroke, $m_{R,FG,(N)}$ is the gas amount flowing backward into the intake manifold 20 at current compression stroke, $\bullet m_{R,FG,(N-1)}$ is the gas amount flowing backward into the intake manifold 20 at previous compression stroke, and AFR(air fuel ratio) is the theoretical air-fuel ratio (or, the target air-fuel ratio).

In the equation 6, when a driving condition of the engine is a normal state (e.g., in case where engine torque and engine speed are smoothly changed), the gas amount $(m_{R,FG,(N)})$ flowing backward into the intake manifold 20 at current compression stroke and the gas amount $(\bullet m_{R,FG,(N-1)})$ lowing backward into the intake manifold 20 at previous compression stroke are the same.

Accordingly, the fuel amount injected into the cylinder 10 at next intake stroke can be calculated from following equation 7.

$$m_{FULE} = \frac{m_{CYL,FG,(N)}}{AFR} \quad \text{[equation 7]}$$

However, when the driving condition of the engine is a transient state (e.g., in case where engine torque and engine speed are rapidly changed), the gas amount $(m_{R,FG,(N)})$ flowing backward into the intake manifold 20 at current compression stroke and the gas amount $(\bullet m_{R,FG,(N-)})$ lowing backward into the intake manifold 20 at previous compression stroke are not same. Therefore, the fuel amount injected into the cylinder 10 at next intake stroke is calculated from the equation 6.

For convenience of description, an example of a case where a closing timing of the intake valve 12 is retarded after BDC (bottom dead center) like the LIVC (late intake valve closing) will be explained.

Figure 3:
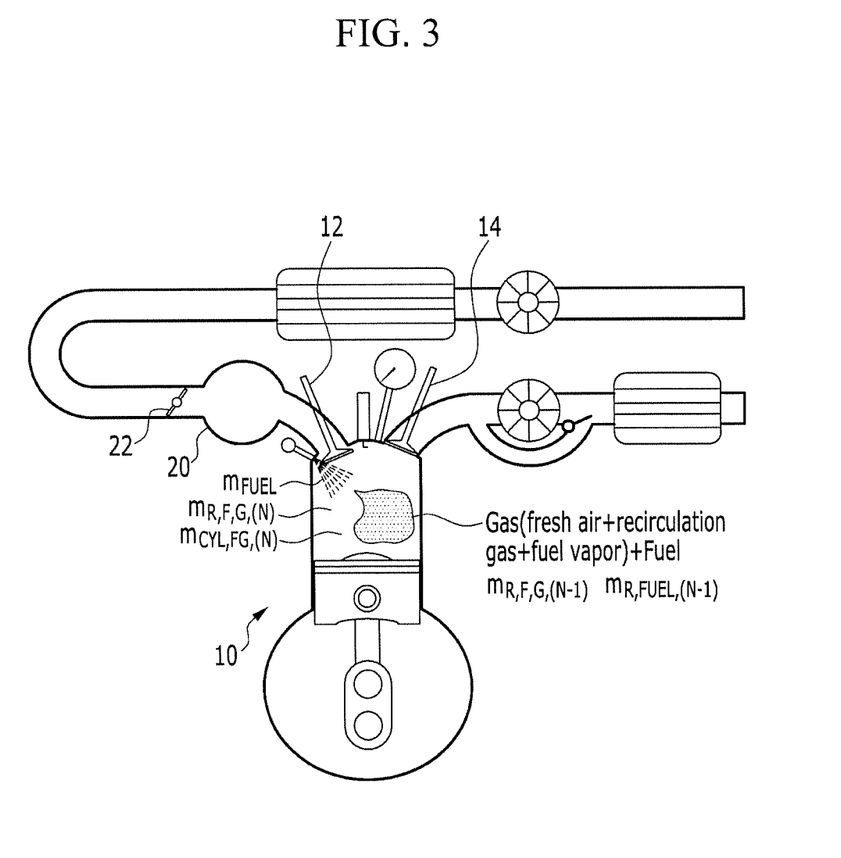
FIG. 3 and FIG. 4 are schematic views for explaining a process of calculating a fuel amount according to an exemplary embodiment of the present disclosure.
Figure 4:
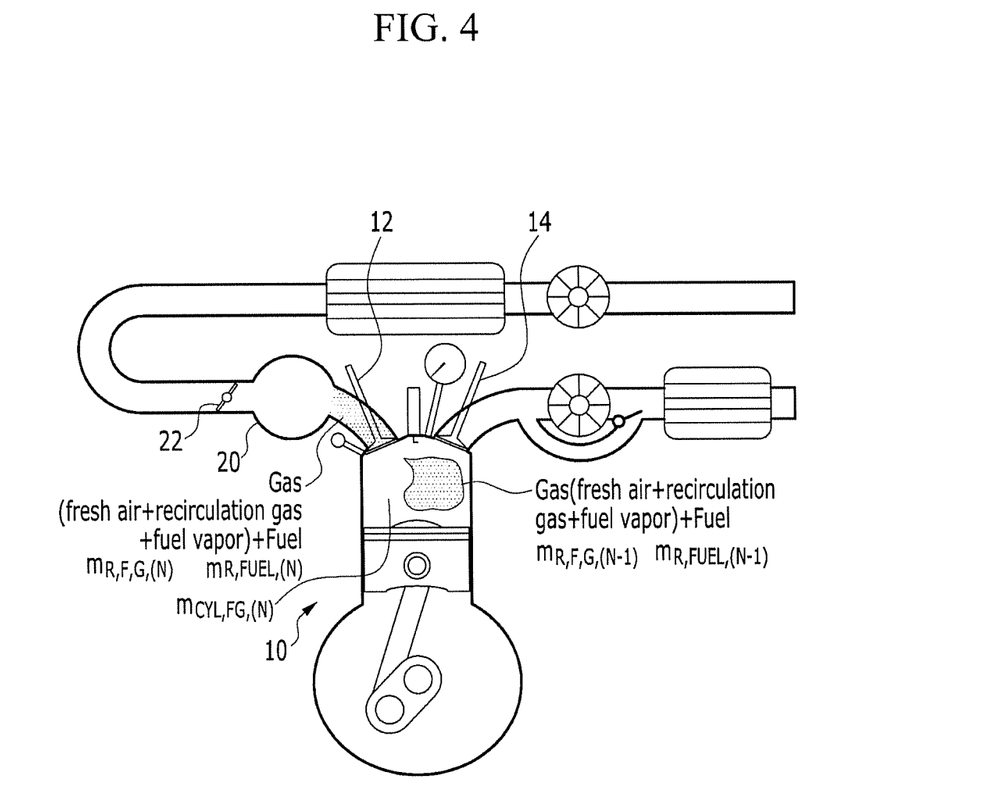

FIG. 3 and FIG. 4 are schematic views for explaining a process of calculating a fuel amount according to an exemplary embodiment of the present disclosure. FIG. 3 shows the engine at intake stroke, and FIG. 4 shows the engine at compression stroke.

Referring to FIG. 3 and FIG. 4, the gas amount $(m_{CYL,FG,(N)})$ supplied to the cylinder 10 at a current intake stroke including fuel $(m_{R,FULE,(N-1)})$ flowing backward into the intake manifold 20 at previous compression stroke flows into the cylinder 10.

Assumed that the theoretical air-fuel ratio (or, target air-fuel ratio) is 14.6 at previous intake stroke, the fuel amount $(m_{R,FULE,(N-1)})$ flowing backward into the intake manifold 20 at the previous compression stroke is 1/14.6 of the gas amount $(m_{R,FG,(N-1)})$ flowing backward into the intake manifold 20 at the previous compression stroke.

And assumed that the theoretical air-fuel ratio (or, target air-fuel ratio) is 14.6 at current intake stroke, the fuel amount $(m_{R,FULE(N)})$ flowing backward into the intake manifold 20 at current compression stroke of the fuel amount $(m_{FULE,(N)})$ injected into the cylinder 10 at current intake stroke is 1/14.6 of the gas amount $(m_{CYL,FG(N)})$ supplied into the cylinder 10 at current intake stroke.

Accordingly, the fuel amount injected to the cylinder 10 at next intake stroke can be exactly calculated from the equation 6 considering a difference of the gas amount flowing backward into the intake manifold 20 at previous compression stroke and current compression stroke.

Hereinafter, the method for controlling fuel injection according to an exemplary embodiment of the present disclosure will be described in detail with reference to accompanying drawings.

Figure 5:
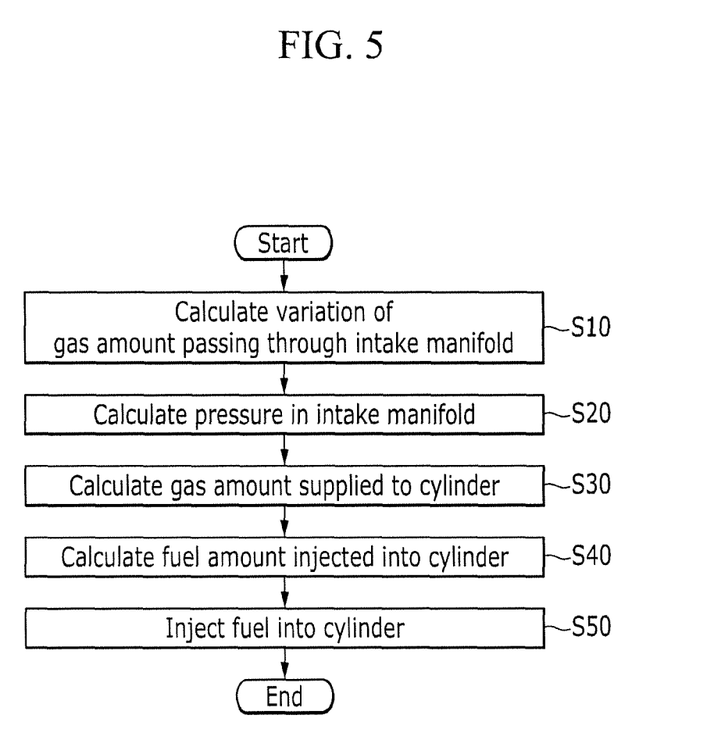
FIG. 5 is a flowchart illustrating a method for controlling fuel injection according to an exemplary embodiment of the present disclosure.

FIG. 5 is a flowchart illustrating a method for controlling fuel injection according to an exemplary embodiment of the present disclosure.

Referring to FIG. 5, the controller 90 calculates a variation of gas amount passing through the intake manifold 20 at the previous intake stroke current intake stroke based on the driving information detected by the driving information detector 80 at step S10. The gas amount may include the fresh air amount flowing into the intake manifold 20 from outside, the recirculation gas amount flowing into the intake manifold 20 through the exhaust gas recirculation apparatus 40, the fuel vapor amount flowing into the intake manifold 20 through the canister purge system 30 and the fresh air, the recirculation gas and the fuel vapor supplied to the cylinder 10 from the intake manifold 20. At this time, referring to the equation 1 and the equation 3, the gas amount passing through the intake manifold 20 can be calculated from a relationship of the gas amount flowing into the intake manifold 20 and the gas amount discharged from the intake manifold 20.

The controller 90 calculates the pressure in the intake manifold 20 based on the gas amount passing through the intake manifold 20 at step S20. Referring the equation 5, the pressure in the intake manifold 20 and the pressure of the recirculation gas flowing into the intake manifold 20 can be calculated from the pressure variation in the intake manifold 20 and the pressure variation of the recirculation gas flowing into the intake manifold 20.

The controller 90 calculates the gas amount supplied to the cylinder 10 at previous intake stroke and current intake stroke from the pressure in the intake manifold 20 at step S30. At this time, the gas amount supplied to the cylinder 10 at intake stroke is determined based on the pressure in the intake manifold 20 by experiment and stored in the controller 90 as a map data format.

The controller 90 calculates the fuel amount injected into the cylinder 10 at next intake stroke by using the gas amount supplied to the intake manifold 20 at current intake stroke and the gas amount flowing backward into the intake manifold 20 at previous compression stroke and current compression stroke at step S40. At this time, the fuel amount injected into the cylinder 10 at next intake stroke can be calculated to correspond to theoretical air-fuel ratio (or, target air-fuel ratio) using the equation 6.

Finally, the controller 90 controls the injector 16 in which the calculated fuel amount is injected into the cylinder at step S50.

As described above, according to an exemplary embodiment of the present disclosure, it is possible to exactly calculate the fuel amount to be theoretical air-fuel ratio(or, target air-fuel ratio) at next intake stroke by using the air amount supplied to the cylinder 10 at previous intake stroke and current intake stroke and the air amount flowing backward into the intake manifold 20 at previous compression stroke.

Further, since it is possible to control the fuel amount injected into the cylinder 10 to be theoretical air-fuel ratio (or, target air-fuel ratio), purification efficiency by an exhaust gas processing device can be improved.

DESCRIPTION OF SYMBOLS

10: cylinder
12: intake valve
14: exhaust valve
16: injector
20: intake manifold
30: canister purge system
40: exhaust gas recirculation apparatus
50: variable valve apparatus
80: driving information detector
90: controller While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling fuel injection comprising:
   a driving information detector for detecting driving information including a fresh air amount flowing into an intake manifold through a throttle valve, a recirculation gas amount supplied to the intake manifold through an exhaust gas recirculation apparatus, a fuel vapor amount supplied to the intake manifold through a canister purge system, a gas amount supplied to a cylinder from the intake manifold, an internal pressure of the intake manifold, an internal temperature of the intake manifold, a pressure of a recirculation gas and a temperature of the recirculation gas;

an injector for injecting fuel into the cylinder; and a controller for calculating a gas amount supplied to the cylinder at a next intake stroke from the driving information and controlling a fuel amount injected by the injector at the next intake stroke to be a target air-fuel ratio.

2. The apparatus of claim 1, wherein
   the controller calculates the fuel amount injected to the cylinder at the next intake stroke based on a gas amount flowing backward into the intake manifold at a previous compression stroke, a gas amount flowing backward into the intake manifold at a current compression stroke and a gas amount supplied to the cylinder at a current intake stroke.

3. The apparatus of claim 2, wherein
   the controller further calculates a pressure in the intake manifold from variation of an air amount passing through the intake manifold and variation of the recirculation gas amount, and
   calculates the gas amount supplied to the cylinder at the next intake stroke from the pressure in the intake manifold.

4. The apparatus of claim 3, wherein
   the gas amount supplied to the cylinder in accordance with the pressure in the intake manifold is determined by experiments.

5. The apparatus of claim 3, wherein
   the pressure in the intake manifold and the pressure of the recirculation gas is calculated from the pressure in the intake manifold at the current intake stroke, the pressure of the recirculation at the current intake stroke, a pressure variation in the intake manifold at the current intake stroke, a pressure variation of the recirculation at the current intake stroke, the pressure variation in the intake manifold at a previous intake stroke, and the pressure variation of the recirculation flowing into the intake manifold at the previous intake stroke.

6. The apparatus of claim 5, wherein
   the pressure in the intake manifold is calculated from an equation of $$\begin{bmatrix} P_{IM} \\ P_{EGR} \end{bmatrix}^{N+1} = \begin{bmatrix} P_{IM} \\ P_{EGR} \end{bmatrix}^{N} + \frac{\Delta t}{2} \left( \begin{bmatrix} \dot{P}_{IM} \\ \dot{P}_{EGR} \end{bmatrix}^{N-1} + \begin{bmatrix} \dot{P}_{IM} \\ \dot{P}_{EGR} \end{bmatrix}^{N} \right),$$

wherein $P_{IM}$ is the pressure in the intake manifold, $P_{EGR}$ is the pressure of the recirculation gas, $\dot{P}_{IM}$ is a pressure variation in the intake manifold, and $\dot{P}_{EGR}$ is pressure variation of the recirculation gas.

7. The apparatus of claim 2, wherein
   the fuel amount injected to the cylinder at the next intake stroke is calculated from the gas amount supplied to the cylinder at the current intake stroke, the gas amount flowing backward into the intake manifold at the current compression stroke, the gas amount flowing backward into the intake manifold at the previous compression stroke, and the target air-fuel ratio.

8. The apparatus of claim 7, wherein the fuel amount injected to the cylinder at the next intake stroke is calculated from an equation of $$m_{FULE} = \frac{m_{CYL,FG,(N)} + m_{R,FG,(N)} - m_{R,FG,(N-1)}}{AFR},$$

wherein $m_{CYL,FG,(N)}$ is the gas amount supplied to the cylinder at the current intake stroke, $m_{R,FG,(N)}$ is the gas amount flowing backward into the intake manifold at the current compression stroke, $\bullet m_{R,FG,(N-1)}$ is the gas amount flowing backward into the intake manifold at the previous compression stroke, and AFR is the target air-fuel ratio.

9. A method for controlling fuel injection comprising:
calculating, by a controller, a variation of a gas amount passing through an intake manifold at a previous intake stroke and a current intake stroke;
calculating, by the controller, a pressure in the intake manifold based on the variation of the gas amount passing through the intake manifold;
calculating, by the controller, a gas amount supplied to the cylinder at a next intake stroke based on the pressure in the intake manifold;
calculating, by the controller, a fuel amount which is injected to the cylinder to be a target air-fuel ratio based on the gas amount supplied to the cylinder; and
controlling, by the controller, an injection to inject the fuel amount at the next intake stroke.

10. The method of claim 9, wherein the gas amount supplied to the cylinder in accordance with the pressure in the intake manifold is determined by experiments.

11. The method of claim 9, wherein the pressure in the intake manifold and a pressure of a recirculation gas is calculated from the pressure in the intake manifold at a current intake stroke, the pressure of the recirculation at the current intake stroke, a pressure variation in the intake manifold at the current intake stroke, a pressure variation of the recirculation at the current intake stroke, the pressure variation in the intake manifold at a previous intake stroke, and the pressure variation of the recirculation flowing into the intake manifold at the previous intake stroke.

12. The method of claim 11, wherein the pressure in the intake manifold is calculated from an equation of $$\begin{bmatrix} P_{IM} \\ P_{EGR} \end{bmatrix}^{N+1} = \begin{bmatrix} P_{IM} \\ P_{EGR} \end{bmatrix}^{N} + \frac{\Delta t}{2} \left( \begin{bmatrix} \dot{P}_{IM} \\ \dot{P}_{EGR} \end{bmatrix}^{N-1} + \begin{bmatrix} \dot{P}_{IM} \\ \dot{P}_{EGR} \end{bmatrix}^{N} \right),$$

wherein $P_{IM}$ is the pressure in the intake manifold, $P_{EGR}$ is the pressure of the recirculation gas, $\dot{P}_{IM}$ is a pressure variation in the intake manifold, and $\dot{P}_{EGR}$ is a pressure variation of the recirculation gas.

13. The method of claim 9, wherein the fuel amount injected to the cylinder at the next intake stroke is calculated from the gas amount supplied to the cylinder at the current intake stroke, the gas amount flowing backward into the intake manifold at the current compression stroke, the gas amount flowing backward into the intake manifold at the previous compression stroke, and the target air-fuel ratio.

14. The method of claim 13, wherein the fuel amount injected to the cylinder at the next intake stroke is calculated from the gas amount supplied to the cylinder at the current intake stroke, the gas amount flowing backward into the intake manifold at the current compression stroke, the gas amount flowing backward into the intake manifold at the previous compression stroke, and the target air-fuel ratio.

15. The method of claim 14, wherein the fuel amount injected to the cylinder at the next intake stroke is calculated from an equation of $$m_{FULE} = \frac{m_{CYL,FG,(N)} + m_{R,FG,(N)} - m_{R,FG,(N-1)}}{AFR},$$

wherein $m_{CYL,FG,(N)}$ is the gas amount supplied to the cylinder at the current intake stroke, $m_{R,FG,(N)}$ is the gas amount flowing backward into the intake manifold at the current compression stroke, $\bullet m_{R,FG,(N-1)}$ is the gas amount flowing backward into the intake manifold at the previous compression stroke, and AFR is the target air-fuel ratio.

* * * * *